UNITED STATES PATENT OFFICE.

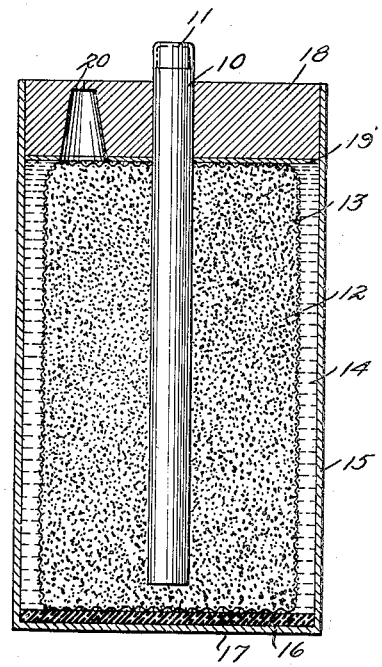
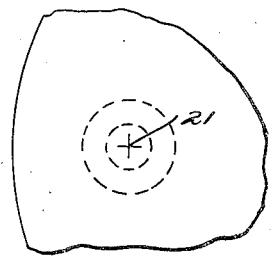
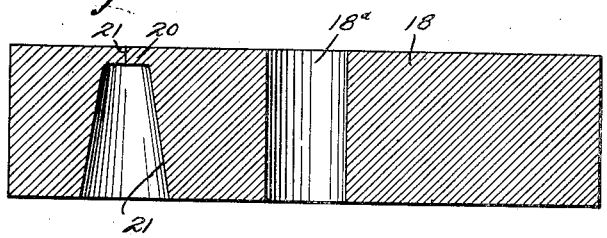

BORIS H. TEITELBAUM, OF BROOKLYN, NEW YORK, ASSIGNOR TO HARRY M. KORETZKY AND ISRAEL KORETZKY, OF NEW YORK, N. Y.

DRY BATTERY.

1,366,298.  Specification of Letters Patent.  Patented Jan. 18, 1921.

Application filed December 3, 1919. Serial No. 342,242.

*To all whom it may concern:*

Be it known that I, BORIS H. TEITELBAUM, a citizen of the United States, and a resident of the city of New York, borough of Brooklyn, county of Kings, and State of New York, have invented a new and Improved Dry Battery, of which the following is a full, clear, and exact description.

This invention relates to improvements in dry batteries, and has reference more particularly to a dry battery having zinc chlorid as an ingredient in the electrolyte, and also being provided with a valve arranged to allow the escape of the ammonia formed as the battery is used, but to exclude the air from said battery.

An object of this invention is to provide a dry battery which will have a low internal resistance and consequently a high short circuit amperage.

Another object of this invention is to provide a dry battery which will have a large service capacity and which will remain out of service for a long period of time without deterioration.

A still further object of this invention is to provide a means for permitting the escape of the ammonia gas formed as the cell is used and to exclude the air which would ordinarily cause rapid drying of the electrolytic paste.

It has been found that the use of zinc chlorid in the electrolyte of a dry battery and also in the depolarizing mixture, decreases the rapid consumption of the zinc electrode by the sal ammoniac when the battery is not in service, owing to the fact that the solution tension of the zinc in the solution of sal ammoniac is counterbalanced by the osmotic pressure of the zinc ions in the solution of sal ammoniac. It is thought that the zinc chlorid in the solution of sal ammoniac also prevents local action on the zinc electrode. However, heretofore the zinc chlorid has been added to the electrolyte in very large proportions, and as a result insoluble zinc hydroxid and double salts of zinc are formed which precipitate from the electrolyte and clog up the interstices in the depolarizing core so that the internal resistance of the dry battery is rapidly increased in use, thus rapidly diminishing the short circuit amperage. The clogging of the depolarizing core by these insoluble salts also prevents the passage of the ammonia gas generated in the battery so that said battery often bursts. These insoluble salts also absorb some moisture from the paste in their formation so that the moisture content in the electrolyte is diminished.

It is known that the primary reaction which occurs in a dry battery having a zinc electrode, and an electrolyte containing sal ammoniac, is as follows:

$$2NH_4Cl + Zn = ZnCl_2 + 2NH_3 + H_2$$

When an excess of zinc chlorid is present, as is commonly found in the ordinary dry battery, the ammonia reacts with the zinc chlorid according to the following reaction:

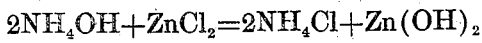

$$2NH_4OH + ZnCl_2 = 2NH_4Cl + Zn(OH)_2$$

This zinc hydroxid precipitates and eventually clogs up the interstices of the depolarizing core.

I have found by experiment that when zinc is brought into contact with an aqueous solution of its salts such as zinc chlorid of any concentration whatever, there is neither a perceptible passage of zinc into solution, nor a deposition of zinc from the solution. Thus it seems that even very small percentages of zinc chlorid in a solution will prevent the zinc from going into solution and will also prevent the phenomenon commonly known as local action. This fact is probably due to some electro-chemical relations between the zinc and its salt.

As the result of a series of experiments, I have arrived at the following proportions for making my electrolytic paste and my depolarizing core so as to avoid an excess of zinc chlorid:—

Zinc chlorid free from iron is dissolved in distilled water until a specific gravity of 1.25 or a Baumé test of 29° is reached at a temperature of about 70 degrees Fahrenheit. The solution will now be found to contain 26.36% of zinc chlorid. The solution is filtered to get rid of the insoluble impurities in the salt and for each 100 parts by weight of the filtrate, a gram molecular weight or 53.5 parts by weight of sal ammoniac is added. After the sal ammoniac is completely dissolved, the solution is again filtered and flour or starch or a mixture of both is then added to the filtrate in amounts just sufficient to gelatinize. I have found that this electrolyte contains the chemicals in the most desirable proportions so that the osmotic pressure of the zinc chlorid counterbalances the solution tension of the zinc electrode and prevents local action, but does not afford an excess of the zinc chlorid so that no insoluble hydroxid or double salts of zinc are formed.

In the compounding of the depolarizing mixture heretofore, a very fine manganese dioxid powder has been used which while it gives a greater surface for depolarization, greatly increases the internal resistance of the battery and consequently decreases the short circuit amperage of the battery. Also when a very fine manganese dioxid powder is molded under the noncontrolled pressure of the human hand or of machines in use at present, a depolarizing core is formed which is not porous enough to afford passage to the gases generated, so that the battery frequently bursts. I have therefore found that the most ideal grain size of manganese dioxid which can be used is one in which the grains will pass through a sieve having forty meshes to the square inch, but will be retained on a fifty mesh sieve. I then mix the manganese dioxid thoroughly with a suitable quantity of granular graphite of the same size, said graphite serving to increase the conductivity of the mixture. I then subject the mixture of manganese dioxid and graphite to a current of hot air at a temperature of 80–100° C. which will drive off any volatile matter which may be present in the mixture without decomposing the manganese dioxid. The mixture of manganese dioxid and graphite is then cooled and moistened with a mixture of the aforementioned zinc chlorid-ammonium chlorid solution, and one part by weight of glacial acetic acid. The slight amount of organic matter present in the manganese dioxid dissolves in the acetic acid and reduces the internal resistance of the battery, thereby increasing the short circuit amperage thereof. After the graphite-manganese dioxid mixture is treated in the aforementioned manner, it is molded into shape around a stick of carbon which serves as the positive electrode of the battery.

Reference is to be had to the accompanying drawings, forming part of this specification in which it is understood that the drawing is merely illustrative of one example of the invention and in which:—

Figure 1 is a central sectional view through my improved battery.

Fig. 2 is a fragmentary top view on a large scale of a portion of the dry battery cover showing my improved type of valve for permitting the egress of the gases formed in the battery and excluding the air from said battery.

Fig. 3 is a central sectional view on a large scale through the dry battery cover showing my improved valve.

Referring to the accompanying drawing by numerals, 10 is the aforementioned carbon stick in my improved battery which forms the positive electrode and is provided at one end with a brass cap 11 or other suitable terminal. This carbon stick is surrounded by a depolarizing core 12 made up in the aforementioned manner, said core being inclosed by a bag 13 composed of any suitable fabric, said bag serving to hold the depolarizing core intact and also to separate said core from an electrolytic paste 14, for which I have previously described the method of preparation. The electrolytic paste 14 is contained in any suitable receiver 15 which preferably serves as the negative electrode of the battery and is preferably made of zinc, but other suitable materials may be used. An insulating washer 16 is provided on the bottom 17 of the zinc receiver to separate the depolarizing core and the electrolytic paste from the bottom of said receiver, so that said bottom is not subjected to electrolytic action. The battery is closed by a stopper 18 which I make preferably of rubber, but any other suitable material may be used. In order to prevent the absorption of moisture by the rubber stopper from the inside of the battery, I coat the lower surface of the rubber stopper with a layer of paraffin 19. The carbon electrode 10 passes through a tightly fitting hole 18ª in the rubber stopper so that said electrode is supported by the stopper.

In order to allow the escape of the gases, largely ammonia, from the battery, I provide a valve consisting of a resilient membrane 20 in which is cut a plurality of slots 21, preferably a pair of right angled slots as shown in Fig. 2. These resilient sectors of the membrane 20 will open outwardly when the pressure of the ammonia gas on the inside of the battery exceeds atmospheric pressure, thereby relieving said pressure, but when the pressure is relieved the valve will close and will prevent air from entering the battery and drying out the contents thereof. A chamber 21 is formed in the underside of the rubber stopper leading to the membrane, which may be frustoconical in shape as shown in the drawing.

I would state in conclusion that while the illustrated and described example constitutes a practical embodiment of my invention, I do not limit myself strictly to the aforementioned details, since manifestly the same can be considerably varied without departure from the spirit of the invention, as defined in the appended claims.

Having thus described my invention, I claim as new and desire to secure by Letters Patent:

1. A dry battery provided with an electrolyte containing zinc chlorid in proportions sufficient to counterbalance the solution tension of the electrode but not sufficient to cause the formation of insoluble salts.

2. A dry battery with an electrolyte containing a zinc compound in proportions sufficient to counterbalance the solution tension of the electrode, but not sufficient to cause the formation of insoluble salts.

3. In a dry battery, the combination with an electrode, of an electrolyte containing a compound of an element contained in said electrode, said compound being in proportions sufficient to counterbalance the solution tension of the electrode, but not sufficient to cause the formation of insoluble salts.

4. A process for making the electrolyte of a dry battery which consists in dissolving substantially 53.5 parts by weight of sal ammoniac in substantially 100 parts by weight of a pure solution containing substantially 26.36% of zinc chlorid, filtering the solution, and adding flour and or starch to said solution in amounts sufficient to gelatinize.

5. A method for making a dry battery which includes the dissolving of substantially 53.5 parts by weight of sal ammoniac in substantially 100 parts by weight of a pure solution containing substantially 26.36% of zinc chlorid, filtering the solution, adding flour and or starch to said solution in amounts sufficient to gelatinize, mixing granular graphite with manganese dioxid composed of grains of such size as to pass through a sieve having 40 meshes to the square inch but to be retained on a 50 mesh sieve, subjecting the mixture of manganese dioxid and graphite to a current of hot air at a temperature of 80–100° C., moistening the mixture of manganese dioxid and graphite with said solution of zinc chlorid and sal ammoniac together with one part by weight of glacial acetic acid, said manganese dioxid-graphite mixture serving as the depolarizing mixture for the dry battery, and said zinc chlorid-sal ammoniac solution acting as the electrolyte for the dry battery.

BORIS H. TEITELBAUM.